United States Patent
Nolan et al.

(10) Patent No.: US 10,709,108 B2
(45) Date of Patent: Jul. 14, 2020

(54) AUTOMATED SCENT TRAINING

(71) Applicants: Patrick L. Nolan, Smithsburg, MD (US); Simon Prins, Elburg (NL)

(72) Inventors: Patrick L. Nolan, Smithsburg, MD (US); Simon Prins, Elburg (NL)

(73) Assignees: Partrick L. Nolan, Smithsburg, MD (US); Simon Prins, Elburg (NL)

( * ) Notice: Subject to any disclaimer, the term of this patent is extended or adjusted under 35 U.S.C. 154(b) by 0 days.

(21) Appl. No.: 16/121,853

(22) Filed: Sep. 5, 2018

(65) Prior Publication Data

US 2019/0008119 A1 Jan. 10, 2019

Related U.S. Application Data

(63) Continuation-in-part of application No. 15/639,674, filed on Jun. 30, 2017.

(51) Int. Cl.
*A01K 15/02* (2006.01)
*A01K 5/01* (2006.01)

(52) U.S. Cl.
CPC ............ *A01K 15/02* (2013.01); *A01K 5/0114* (2013.01)

(58) Field of Classification Search
CPC ........ A01K 15/02; A01K 5/0114; A01K 5/02; A01K 15/027; A01K 15/021; A01K 29/005; Y10S 119/905
See application file for complete search history.

(56) References Cited

U.S. PATENT DOCUMENTS

| | | | |
|---|---|---|---|
| 3,424,132 A | 1/1969 | Fischer et al. | |
| 3,773,018 A | 11/1973 | Profughi | |
| 3,981,274 A | 9/1976 | Curtis | |
| 4,766,848 A | 8/1988 | Rocco et al. | |
| 5,566,645 A | 10/1996 | Cole | |
| 5,918,257 A | 6/1999 | Mifsud et al. | |
| 6,213,056 B1 | 4/2001 | Bergmann et al. | |
| 6,273,027 B1 | 8/2001 | Watson et al. | |
| 6,837,178 B1* | 1/2005 | Nall | A01K 39/014 119/57.8 |
| 6,843,158 B2 | 1/2005 | Garcia et al. | |
| 7,198,008 B2 | 4/2007 | Poyner | |

(Continued)

FOREIGN PATENT DOCUMENTS

| | | |
|---|---|---|
| CN | 202456059 U | 10/2012 |
| CN | 106614068 A | 5/2017 |

OTHER PUBLICATIONS

International Search Report and Written Opinion in corresponding International Application No. PCT/US18/39656, dated Oct. 30, 2018.

*Primary Examiner* — Trinh T Nguyen
(74) *Attorney, Agent, or Firm* — Edell, Shapiro & Finnan, LLC (57) ABSTRACT

An automated scent training wheel for training animals to detect and respond to target scents. The automated scent training wheel comprises a rotatable carousel and a plurality of scent receptacles coupled to the rotatable carousel, where the scent receptacles are each configured to hold scent source material therein. The automated scent training wheel also comprises a plurality of sensing systems each disposed at one of the plurality of scent receptacles, wherein each sensing system is configured to automatically detect investigation of the associated scent receptacle by an animal.

20 Claims, 8 Drawing Sheets

(56) References Cited

U.S. PATENT DOCUMENTS

| | | |
|---|---|---|
| 7,921,810 B2 | 4/2011 | Lumbroso et al. |
| 8,776,732 B2 | 7/2014 | Curtis et al. |
| 9,545,081 B2 | 1/2017 | Nolan |
| 2001/0047771 A1 | 12/2001 | Bulanda et al. |
| 2006/0174843 A1 | 8/2006 | Poyner |
| 2006/0283394 A1* | 12/2006 | McLaughlin ........ A01K 5/0114 119/51.03 |
| 2009/0038555 A1 | 2/2009 | Reese |
| 2009/0205244 A1 | 8/2009 | Pomerantz |
| 2012/0111285 A1 | 5/2012 | Pearce et al. |
| 2014/0371551 A1 | 12/2014 | Palmer et al. |
| 2015/0128866 A1 | 5/2015 | Madorin et al. |
| 2015/0264892 A1 | 9/2015 | Nir et al. |
| 2016/0081302 A1 | 3/2016 | Hare |

* cited by examiner

AUTOMATED SCENT TRAINING

CROSS-REFERENCE TO RELATED APPLICATIONS

The present application claims priority to U.S. patent application Ser. No. 15/639,647, filed on Jun. 30, 2017, the content of which is hereby incorporated by reference herein.

BACKGROUND

Field of the Invention

Embodiments presented herein are generally directed to the training of animals to detect and respond to target scents/odors.

Related Art

Many animals, such as pigs, dogs, etc., have an acute sense of smell and are commonly used to detect "target" scents/odors, such as scents associated with drugs, explosives, biological substances, chemical substances, etc. For example, trained scent detection dogs are generally among the most reliable means for detecting dangerous or illegal materials, chemical materials, and/or biological materials by the scents which these materials emit and have the ability to do so at extremely low concentrations.

However, before a dog (or other animal) may be employed to perform scent-based detection work, it must first be trained to use its acute sense of smell to detect target scent material in a fast, accurate and reliable manner. In the early stages of training, detection canines (dogs) are typically manually trained by a handler or trainer to detect scents/odors emitted from target material. During a training session, a handler/trainer directs the search and guides the dog (or other animal) to different search locations to sniff for scents emitted from target material hidden at one or more of these locations. Once the target scent is detected and the dog demonstrates a particular desired response, the trainer provides the dog with a timely reward (e.g., food, treats, etc.). The timely pairing of rewards to target odors is important since it not only attaches significance to the target odor, but it also motivates the dog to seek and identify the odor. In essence, the reward more accurately imprints the learned and instinctive behavior associated with such detection work on the dog.

SUMMARY

In one aspect, an automated scent training wheel for training animals to detect and respond to target scents is provided. The automated scent training wheel comprises: a rotatable carousel; a plurality of scent receptacles coupled to the rotatable carousel, wherein the scent receptacles are each configured to hold scent source material therein; and a plurality of sensing systems each disposed at one of the plurality of scent receptacles, wherein each sensing system is configured to automatically detect investigation of the associated scent receptacle by an animal.

In another aspect, a method for scent training an animal using a scent training wheel that includes a rotatable carousel, a plurality of scent receptacles coupled to the rotatable carousel, a plurality of sensing systems each disposed at one of the scent receptacles, and a control system is provided. The method comprises: detecting, with a sensing system disposed at a first one of the plurality of scent receptacles, an investigation of a first one of the plurality of scent receptacles by the animal; receiving, at the control system, one or more signals indicating the investigation of the first one of the plurality of scent receptacles by the animal; and determining, based at least in part on the one or more signals, whether the first one of the plurality of scent receptacles has target scent source material or a non-target scent source material disposed therein.

In another aspect, a scent training system is provided. The scent training system comprises: an automated scent training wheel comprising a rotatable carousel, a plurality of scent receptacles coupled to the rotatable carousel, a plurality of sensing systems each disposed at one of the scent receptacles, and a control system comprising at least one wireless transceiver; and a remote reward dispenser comprising at least one wireless receiver configured to receive commands from the at least one wireless transceiver of the control system.

BRIEF DESCRIPTION OF THE DRAWINGS

Embodiments of the present invention are described herein in conjunction with the accompanying drawings, in which.

DETAILED DESCRIPTION

The following is a detailed description of exemplary embodiments such as those illustrated in the accompany drawings. The invention should not be understood as limited to specific embodiments described below. In addition, it is intended that the description below not be limited to terms of orientation that are used for convenience and ease of understanding. Specifically, it is to be understood that terms such as "top", "bottom", "above", "below", "front", "rear", "side", "length", "width", "transverse", "upper", "lower", "interior", "exterior", "inner", "outer" and the like as may be used herein, merely describe points of reference and do not limit embodiment presented herein to any particular orientation or configuration.

As noted, before being used to perform scent-based detection work, dogs or other animals must first be trained to use their acute sense of smell to detect target scents in a fast accurate and reliable manner. In certain training situations, a handler/trainer directs the search and guides the animal to different search locations to sniff for scents emitted from target material hidden at one or more of these locations.

Once the target scent is detected and the dog demonstrates a particular desired response, the trainer provides the dog with a timely reward (e.g., food, treats, etc.). While such training techniques have proven to be successful in the past, the present applicants have also identified several disadvantages of these techniques.

In particular, one disadvantage associated with conventional techniques for training scent detection animals is that many trainers/handlers train using only "known" hides/marks. With known hides, the location of the target scent source is known to the trainer and the trainer may inadvertently and/or unknowingly communicate the location of the target scent source material to the animal being trained by way of unintentional postural, facial, or other non-verbal cues. Unfortunately, animals trained in this manner begin to rely on these cues to detect the hidden target material instead of, or in addition to, using their acute sense of smell to detect the scents/odors emitted by the hidden target material. Thus, the involvement of the trainer tends to disadvantageously associate the reward with the trainer rather than the scent/odor of the hidden target material.

A more efficient technique for training scent detection animals is the use of "unknown" or "blind" hides/marks (i.e., blind training) where the location of the target scent source material is unknown to the trainer. When the trainer does not know the location of the target scent source material during a training session, the trainer cannot unintentionally provide the animal being trained with non-verbal cues that could be read (recognized) by the animal. As a result, the animal is forced to rely on its acute scent detection capabilities to search for and detect target scent material. Unfortunately, in conventional arrangements, the only method to provide a truly blind hide requires at least two trainers or handlers, where one trainer places the target scent material in a selected location and a second handler, who is unaware of the selected location, directs the animal. The need for multiple trainers may be burdensome and inefficient. Accordingly, there exists a need to enable the use of blind/unknown hides for training of a scent detection animal without the need for a multiple trainers.

Embodiments presented herein are generally directed to automated scent training wheels, automated scent training systems, and associated methods that facilitate the efficient use of blind hides for training of scent detection animals to detect and respond to target scents/odors, while ignoring distractions and concomitant odors. With the automated scent training wheel presented herein, the trainer does not need to know the location of the target odor to reward the animal properly and timely. When the trainer does not know the location of the target odor, the trainer cannot inadvertently influence the animal or interfere with the learning process.

An automated scent training wheel in accordance with embodiments presented herein comprises a rotatable carousel coupled to a plurality of scent receptacles each configured to hold scent source material. The scent source material disposed in a scent receptacle may be configured to emit a "target" scent (i.e., a scent that the canine should learn to detect and alert a handler) or a "non-target" scent (i.e., a scent that the canine should learn to ignore). A source material that emits a target scent is sometimes referred to herein as a "target scent source material," while a source material that emits a non-target scent is sometimes referred to herein as a "non-target scent source material." A target scent may include, for example, narcotic scents, explosives scents, chemical and biological agent scents, currency scents, foodstuff scents, insect scents, cancer cell scents, etc.

In the automated scent training wheels presented herein, a sensing system is located at each scent receptacle and is configured to detect when an animal "investigates" the associated scent receptacle. As used herein, an "investigation" of a scent receptacle refers to an event in which the animal sniffs the scent source material, such as when the animal inserts its nose into the scent receptacle. The automated scent training wheels presented herein also comprise a control system that is in communication with the sensing systems located at each of the scent receptacles. Using data from the sensing systems, the control system is configured to determine whether an animal investigated a scent receptacle that includes a target scent source material (i.e., a target or active scent receptacle) or whether the animal investigated a scent receptacle that includes a non-target scent source material (i.e., a non-target or inactive scent receptacle). The control system may initiate one or more operations based on the result of this determination.

For example, when the control system determines that the animal investigated an active scent receptacle, the control system may automatically initiate rotation of the rotatable carousel. The control system may be configured to initiate at least one of random or pseudo-random rotation of the rotatable carousel so that the next location of the active scent receptacle is unknown to the trainer (and the canine). The control system may also be configured to automatically transmit one or more commands to a remote reward dispenser, wherein the one or more commands are configured to cause the remote reward dispenser to emit an audible marking sound and to dispense a reward to the animal.

Further features of automated scent training wheels and automated scent training systems in accordance with embodiments presented herein are provided below. For ease of illustration, the automated scent training wheels and automated scent training systems in accordance with embodiments presented herein are primarily described herein with reference to the training of canines (dogs). However, it is to be appreciated that these examples are merely illustrative and that the automated scent training wheels and automated scent training systems in accordance with embodiments presented herein may also be used for the training of a number of other animals.

Figure 1:
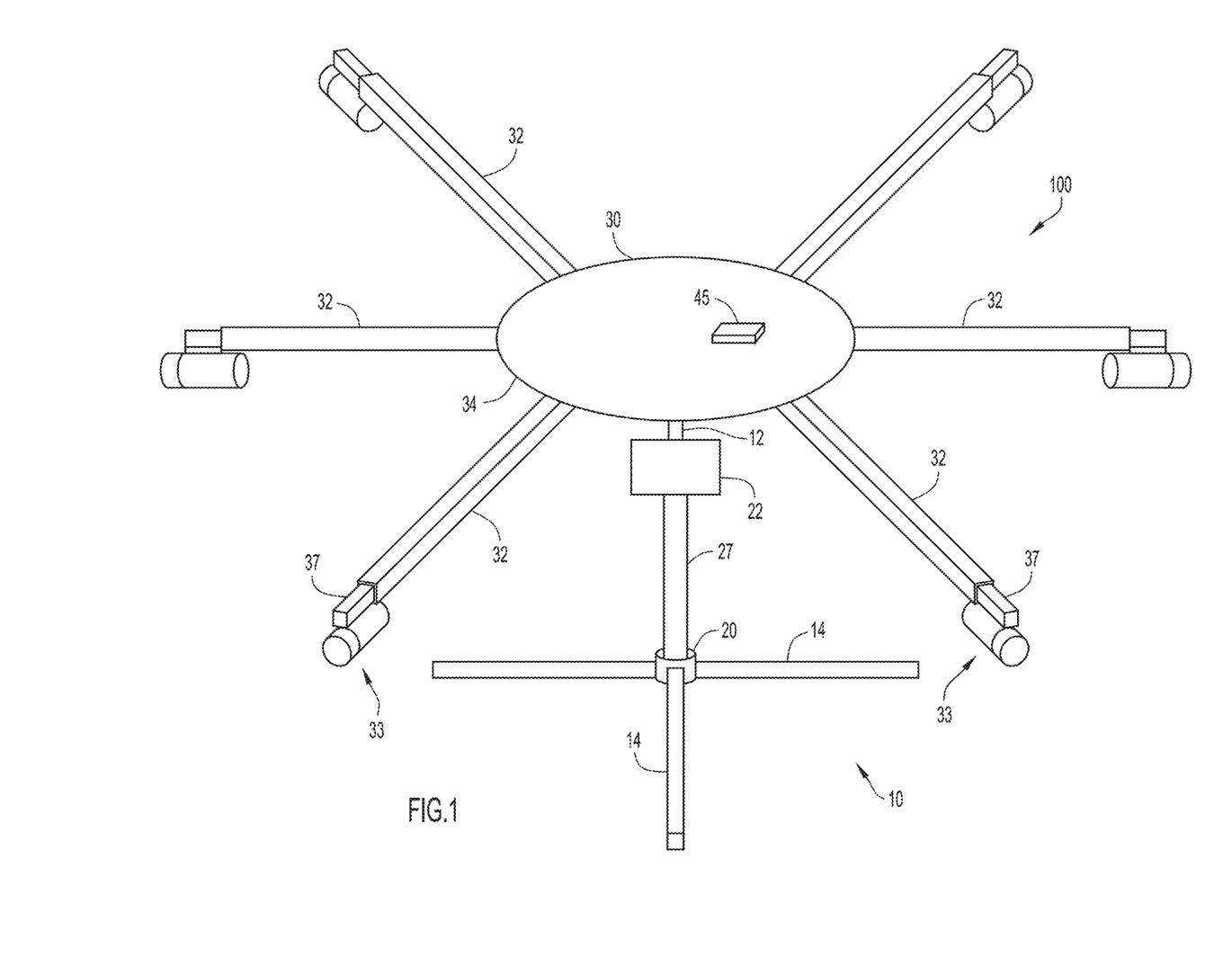
FIG. 1 is a perspective view of an automated scent training wheel, in accordance with certain embodiments presented herein.
Figure 3:
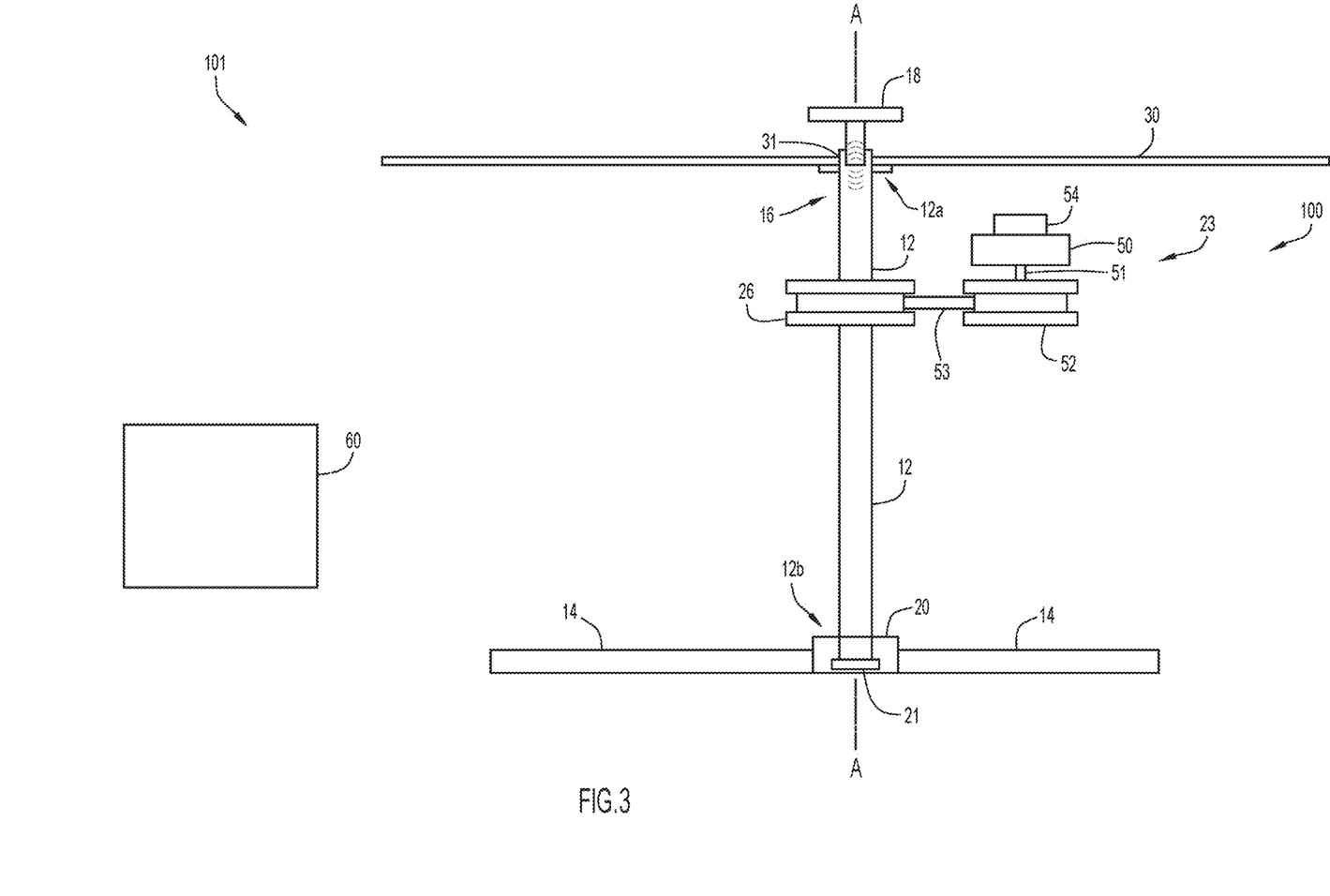
FIG. 3 is a schematic side view of the automated scent training wheel of FIG. 1.

Referring first to FIG. 1, shown is an automated scent training wheel 100 in accordance with certain embodiments presented herein. As shown, automated scent training wheel 100 comprises a support base 10 that is mechanically coupled to, and configured to support, a rotatable carousel 30. As described further below, the rotatable carousel 30 is mechanically coupled to the support base 10 via an elongate (e.g., cylindrically-shaped) rotary shaft or axle 12 that permits the rotatable carousel 30 to rotate relative to the support base 10 about a vertical rotation axis A-A (FIG. 3). In one example, the rotary shaft 12 is formed as a solid metal (e.g., aluminum) rod but, in the alternative, the rotary shaft 12 may be formed as a tubular rod having a hollow core. A drive motor assembly 23 (shown in FIG. 3), disposed within a motor assembly housing 22, is configured to rotate the rotary shaft 12 and, as such, enable rotatable carousel 30 to rotate relative to the support base 10.

In the illustrated embodiment of FIGS. 1 and 3, support base 10 includes four elongated (e.g., tubular) support legs 14, each having first and second ends. The rotary shaft 12 extends upward (vertically) from the legs 14. As shown in FIG. 1, to protect rotary shaft (axle) 12 from damage, a shroud member 27 extends around a portion of the axle between the motor assembly housing 22 and the support legs 14.

In the example of FIG. 1, the support legs 14 have a square cross-sectional configuration, but other suitable configurations (e.g., a cylindrical cross-sectional) configuration may be used in other embodiments. As further shown in FIG. 1, the support legs 14 extend horizontally outward from rotary shaft 12 (i.e., parallel to the rotatable carousel 30) to support the automated scent training wheel 100 on a floor, the ground, or any other support surface. Once the base is assembled, support legs 14 extend transverse to vertical rotary axle 12 (FIG. 1).

The rotary shaft 12 has a first end 12a and an opposing second end 12b (FIG. 3). As shown in FIG. 3, the first end 12a of the rotary shaft 12 is formed with an axially extending threaded hole or recess 16 configured to receive an externally threaded bolt 18 (or other suitable fastener). However, if the rotary shaft 12 is tubular with a hollow core, the interior surface of the rotary shaft may be threaded at first end 12a to receive the externally threaded bolt 18 (or other suitable fastener). FIG. 3 also illustrates that rotatable carousel 30 has a central through-aperture 31 which permits bolt 18 to pass therethrough into engagement with threading 16 such that rotatable carousel 30 is removably affixed to first (upper) end 12a of rotary shaft 12.

The second end 12b of rotary (axle) shaft 12 extends through an opening in the top wall of a bearing housing 20 containing at least one rotation mechanism 21, such as a bearing. In one example, the bearing may comprise an inner ring fixed to the first end 12b of the shaft (axle) and an outer ring fixed to the inner periphery of bearing housing 20. The rotary shaft 12 is rotatably supported by bearing housing 20 via bearing 21 for rotation around the vertical rotation axis A-A.

With reference to FIGS. 1 and 3, the bearing housing 20 has a circular configuration and includes an outward extending circular flange with a series of through-holes spaced approximately 90° apart. However, other suitable spacing may be utilized, as desired. Each through-hole is configured to receive an externally threaded bolt that is affixed to a wall surface of each tubular support leg 14 adjacent the edge of second end. The rotary shaft (axle) 12 is removably attached to support legs 14 by inserting the bolt from one support leg through each through-hole and securely fastening housing 20 to each support leg using an internally threaded locknut. Thus, rotary shaft 12 may be easily detached from support legs 14 to facilitate transport and storage of the scent training wheel 100 by unscrewing the locknuts from the bolt and withdrawing the bolts from through-holes. However, it is to be appreciated that any other suitable type of fastener may be utilized, as desired. Again, once the support base 10 is assembled, rotary axle 12 extends vertically upward from support legs 14 to enable rotatable carousel 30 to rotate, relative to the support base 10, about vertical rotation axis A-A.

Referring again to FIGS. 1 and 3, rotatable carousel 30 is coupled to a plurality of elongated radially extending support arms 32 and each support arm 32 is coupled to a corresponding scent receptacle 33. The scent receptacles 33 may be, for example, a stainless steel or aluminum cup. The rotatable carousel 30 comprises circular body portion 34 fabricated from, for example, aluminum, stainless steel, etc. As noted above, the rotatable carousel 30 is configured to be coupled to the rotary axle 12 (e.g., via the central through-aperture 31 which permits bolt 18 to pass therethrough into engagement with threading 16 (inside end 12a of the rotary axle 12) such that rotatable carousel 30 is removably affixed to first (upper) end 12a of rotary shaft 12).

Figure 2:
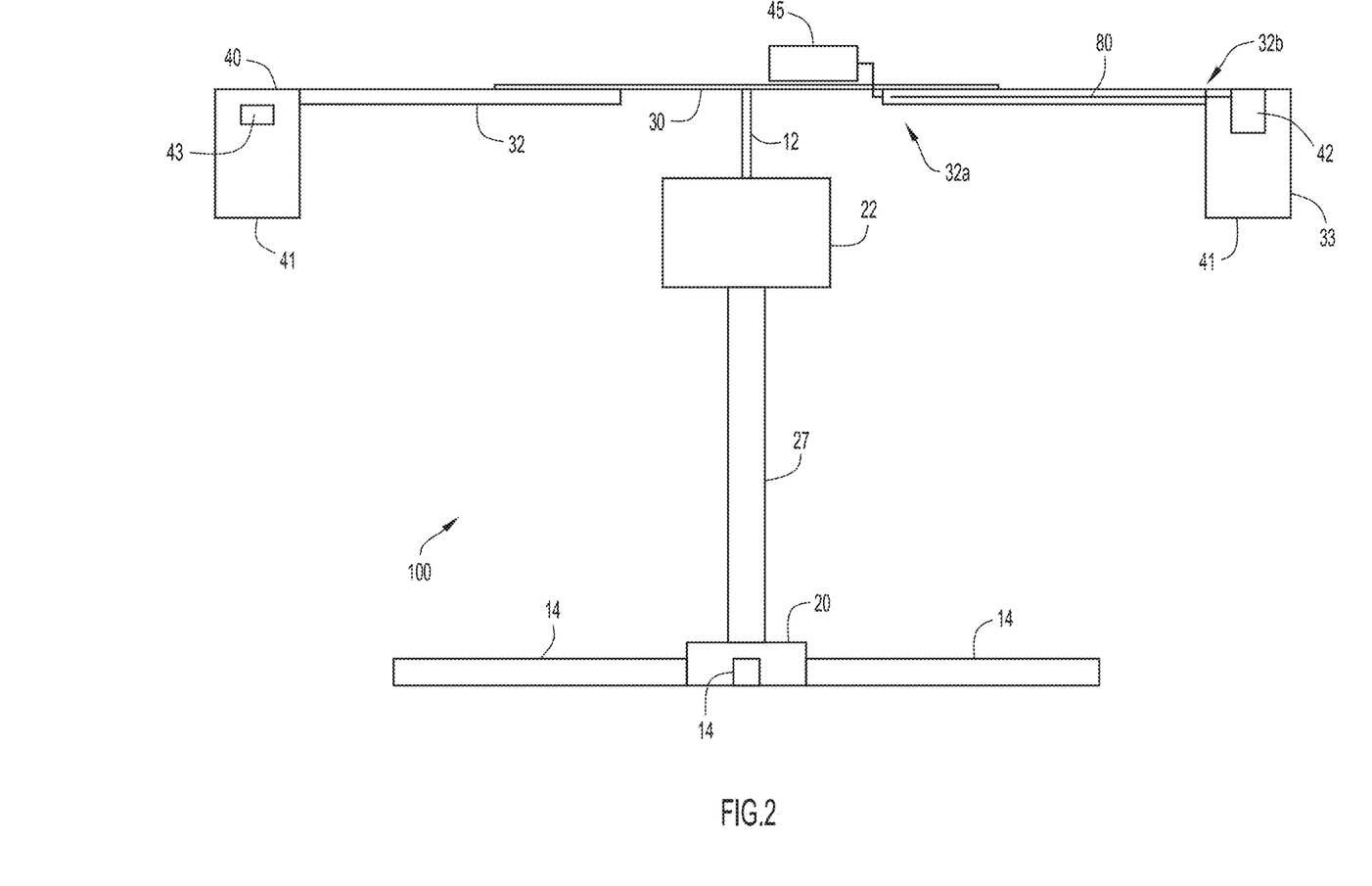
FIG. 2 is a schematic side view of the automated scent training wheel of FIG. 1.

The elongated support arms 32 of rotatable carousel 30 are connected to circular body portion 34. In one example, each support arm 32 is formed as an elongated hollow tube and has first and second opposed ends 32a, 32b. A pair of spaced apart holes extends through a wall of each support arm at end 32a, and another hole extends through the same wall at opposed end 32b. To connect the support arms 32 to circular body portion 34, each support arm is positioned adjacent the lower (bottom) surface of circular body portion 34 (FIG. 2) and the pair of spaced holes at end 32a of support arms 32 is aligned with respective through-holes (not shown) in body portion 34. A suitable threaded fastener (for example, but not limited to, a bolt or machine screw—not shown) is inserted into each aligned hole and tightened to securely fasten support arms 32 to circular body portion 34. The attached support arms 32 extend radially outward from the circular body portion and define radii of a first circle. Furthermore, the use of threaded fasteners enables elongated support arms 32 to be detachable from the rotatable carousel 30 to facilitate transport and storage of the scent training wheel 100.

Referring again to FIG. 1, elongated extension arms 37 are configured to be telescopically received within the interior cavity of each hollow core support arm 32. The extension arms 37 may be slid outward from within their respective support arm 32 to various extended positions and, upon being extended, define radii of a second circle having an increased circumference. Moreover, a suitable locking mechanism, such as a locking screw, may be threaded into a hole at end 32b of each support arm 32 to secure each extension arm 37 in an extended and retracted position.

It is advantageous to have the ability to increase the circle circumference of support arms 32 by sliding the telescoping extension arms 37 outward because the increase circumference lengthens the distance between distal ends of adjacent support arms to create optimum spacing between the support arms to enable an animal (e.g., dog) being trained to walk around the rotatable carousel and search for target and non-target material scents emitted from scent receptacles 33 without shortening its stride. In addition, providing optimum spacing between scent receptacles 33 attached to the distal end of extension arms 37 makes it easier for an animal (e.g., dog) being trained to isolate and detect target material scents and non-target material scents wafting from the receptacles.

While the embodiment shown in FIG. 1 illustrates six radially extending support arms 32 attached to circular body portion 34 of the rotatable carousel, it is to be appreciated that the use of six support arms 32 is illustrative and that other embodiments may include different numbers of support arms, for example (but not limited to), up to twelve radially extending support arms 32. It is also to be appreciated that only a subset of available support arms 32 may be used at a given time (e.g., less arms may be used for less experienced animals).

Referring to FIGS. 1-2 and FIGS. 4A-4B, the scent receptacles (e.g., cups) 33 may comprise an elongated cylindrical body having a cylindrical wall including an open end 40 and a closed end 41. The cylindrical body of each scent receptacle 33 may be fabricated from a thin metal (such as, but not limited to, aluminum or stainless steel) or plastic material. Moreover, each cylindrical body defines an interior cavity in which a removable clear glass container (cup) 38 containing scent emitting target or non-target material is placed and held therein by a frictional interference fit. During training, one cup would typically contain target scent material, while the other cups would either be empty or would contain distractor, control or concomitant material.

Figure 4A:
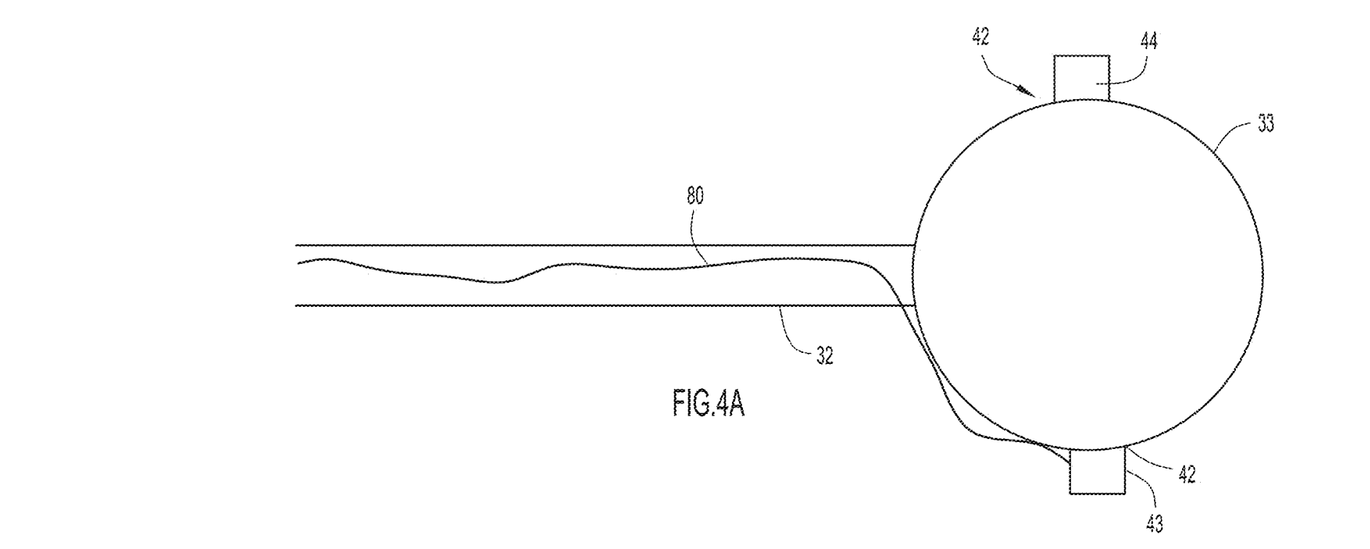
FIG. 4A is a schematic top view of a receptacle connected to a support arm of an automated scent training wheel, in accordance with certain embodiments presented herein.
Figure 4B:
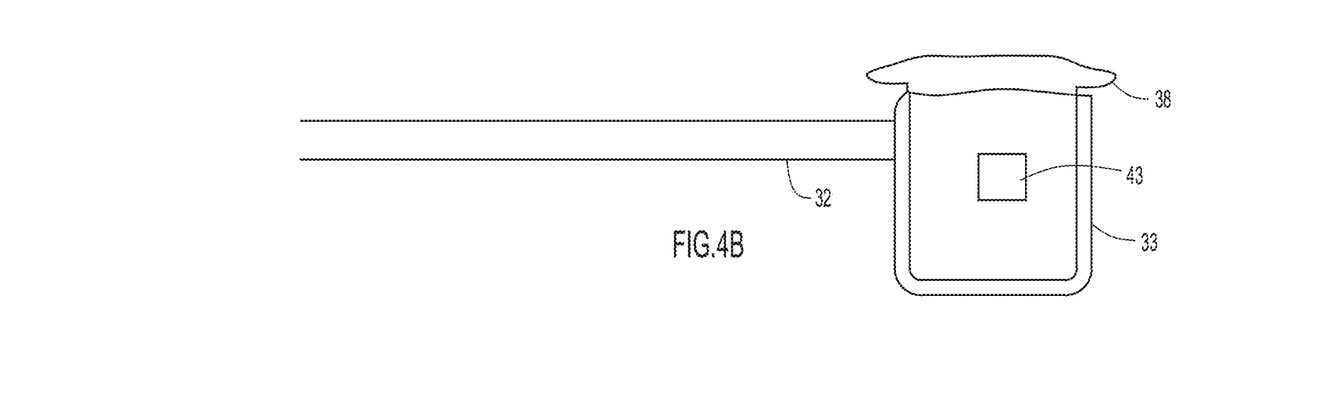
FIG. 4B is a schematic side view of the receptacle of FIG. 4A.

Each scent receptacle 33 may be secured to the outer projecting distal end of each extension arm 37 by any suitable mechanism/technique, such as welding or the like. Moreover, the elongated cylindrical body of each receptacle 33 may be secured to the distal end of each extension arm 37 so as to extend either in a horizontal direction, as shown in FIG. 1, or a vertical direction, as shown in FIG. 4B. Additionally, each scent receptacle 33 has diametrically opposed openings 42 extending through the cylindrical wall to receive a reflective beam sensor 43 and a reflector 44 which is attached to the exterior surface of the receptacle's cylindrical wall (FIG. 4A). The glass cup permits a light beam from sensor 43 to pass through the interior cavity, strike reflector 44 and, thereafter, be reflected back to the reflective beam sensor 43. It should be appreciated that any type of retro-reflective sensor and reflector could be used in embodiments of the present invention. It is also to be appreciated that embodiments of the present invention may be implemented with other types of sensors that do not necessarily include a retro-reflective sensor and reflector. For example, as described further below, embodiments of the present invention may be implemented with diffuse reflective sensors or retro-reflective sensors which do not utilize a reflector. With diffused reflective sensors and retro-reflective sensors both the emitter and receiver are placed in the same housing and are configured for light to be reflected back to the receiver within the same housing as the emitter. Retro reflective sensors use a target to reflect light back to the sensor and will sense an object that breaks the beam's path. The diffuse reflective sensors sense an object when the light beam is reflected back to the sensor.

In accordance with the embodiment of the automated scent training wheel shown in FIGS. 1, 2, 4A, and 4B, at least one sensor module 45 is disposed at the rotatable carousel 30. Although the sensor module 45 is shown located at an upper surface of the rotatable carousel 30, it is to be appreciated that this location is illustrative and that the sensor module 45 could be attached to the lower (bottom) surface of rotatable carousel 30, as well as to any other structure of the automated scent training wheel 100 if so desired.

The reflective beam sensor 43 of each receptacle 33 is wired to and powered by the sensor module 45. The wiring 80 (FIGS. 2 and 4A) extends through support arms 32, 37. However, in other embodiments, the reflective beam sensor 43 may alternatively be wirelessly connected to the sensor module 45.

Again with reference to FIGS. 2 and 3, the automated scent training wheel 100 further comprises a drive motor assembly 23. It is to be appreciated that the drive motor assembly 23 may have a number of different arrangements so as to rotate the rotary axle 12. In FIG. 3, the motor assembly housing 22 has been omitted to show the details of the illustrative drive motor assembly 23. More specifically, in FIG. 3 the drive motor assembly 23 includes pulley 26 affixed to rotary axle 12, a stepper motor 50 including a rotary motor shaft 51, and a rotational coupling system, such as a pulley 52 secured to the motor shaft, and a drive belt 53 engaging pulleys 26 and 52. The rotational coupling system (pulley 52 and drive belt 53) transfers the rotational motion of motor shaft 51 to pulley 26 to rotate carousel 30 about the vertical rotation axis A-A.

FIGS. 1, 2, 3, and 4A/4B generally illustrate one example mechanical arrangement for an automated scent training wheel in accordance with embodiments presented herein. It is to be appreciated that the mechanical arrangement shown in FIGS. 1, 2, 3, and 4A/4B is merely one example and that automated scent training wheels in accordance with embodiments presented herein may have a number of other mechanical arrangements. In addition, automated scent training wheels in accordance with embodiments presented herein may incorporate any of the features described in detail in Applicant's co-pending application Ser. No. 15/582, 921, the disclosure of which is hereby incorporated herein by reference in its entirety.

Figure 5:
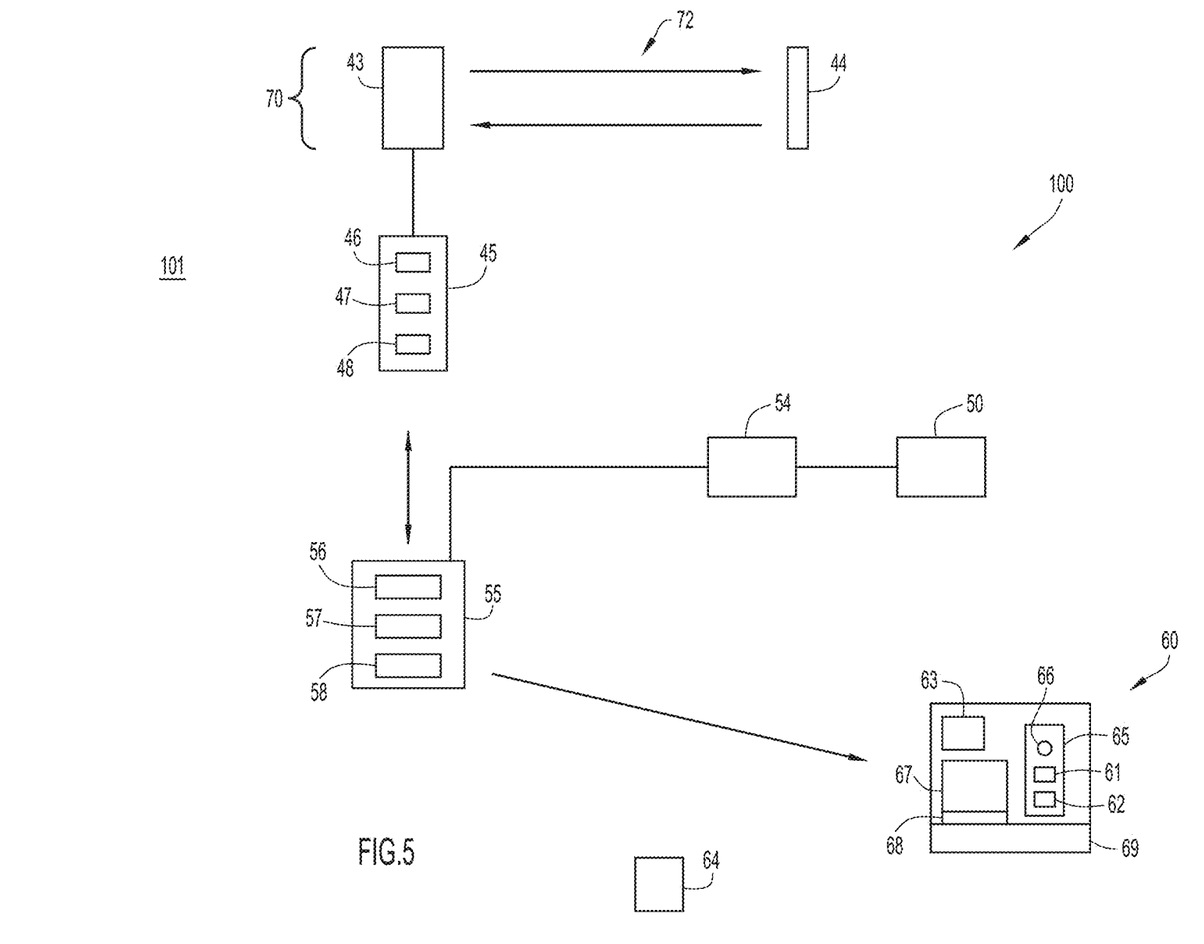
FIG. 5 is a block diagram illustrating exemplary components of an automated scent training system, in accordance with certain embodiments presented herein.

While FIGS. 1, 2, 3, and 4A/4B illustrate an example mechanical arrangement for an automated scent training wheel, operational/functional aspects of scent training wheels and associated training systems in accordance with embodiments presented herein are described herein with reference to FIG. 5. That is, FIG. 5 is a simplified functional block diagram illustrating functional operations of an automated scent training wheel 100 (described above) as well as operation of other elements of an automated training system, referred to herein as an automated scent training system 101, that includes the automated scent training wheel 100. Simply for ease of illustration, the description of FIG. 5 will also make reference to the illustrative mechanical arrangement of FIGS. 1, 2, 3, 4A/4B.

As noted, in certain examples, an automated scent training wheel 100 in accordance with embodiments presented herein may be used as part of an automated scent training system 101. As shown in FIG. 5, the automated scent training system 101 includes the automated scent training wheel 100 and an automated remote reward dispenser 60.

Referring first to the automated scent training wheel 100, as noted each scent receptacle 33 includes a reflective beam sensor 43 and a reflector 44. The reflective beam sensor 43 and the reflector 44 located at a scent receptacle 33 collectively form a respective sensing system 70 that creates a sensing beam 72 across the opening of the associated scent receptacle 33. Therefore, the automated scent training wheel 100 includes a plurality of sensing systems 70, each located at one of the scent receptacle 33.

For ease of illustration, embodiments of the present invention are primarily described with reference to sensing systems 70 that comprise a reflective beam sensor 43 and a corresponding reflector 44. However, as described further below, sensing systems 70 in accordance with embodiments presented herein may have other arrangements. For example, a sensing system 70 in accordance with embodiments presented herein may comprise a diffuse reflective sensor instead of a reflective beam sensor 43 and a corresponding reflector 44. Additionally or alternatively, a sensing system in accordance with embodiments presented herein may comprise a retro-reflective sensor instead of a reflective beam sensor 43 and a corresponding reflector 44.

The automated scent training wheel 100 also includes the sensor module 45 which, in one example, is implemented as a printed circuit board (PCB) comprising, along other elements, at least one processor 46 (e.g., microprocessor or microcontroller), a wireless transmitter/receiver (transceiver) 47, and a memory 48. The automated scent training wheel 100 also includes a main control module 55 that, like the sensor module 45, also comprises, among other elements, at least one processor 56 (e.g., microprocessor or microcontroller), a wireless transmitter/receiver (transceiver) 57, and a memory 58. In certain examples, the main control module 55 may be a mini-computing device. In certain examples, the wireless transceivers 47 and 57 are 2.4 GHz ISM radio devices, although other types of wireless communications may also or alternatively be used in embodiments of the present invention. The sensor module 45 and the main control module 55 are sometimes collectively referred to herein as the "control system" of the automated scent training wheel 100.

The memory 48 and the memory 58 may each include read only memory (ROM), random access memory (RAM), magnetic disk storage media devices, optical storage media devices, flash memory devices, electrical, optical, or other physical/tangible memory storage devices. Thus, in general, the memory 48 and the memory 58 may each comprise one or more tangible (non-transitory) computer readable storage media (e.g., a memory device) encoded with software comprising computer executable instructions and when the software is executed (by the processors 46, 56, respectively) it is operable to perform the operations described herein with reference to the automated training wheel 100.

In the illustrative example of FIG. 5, the remote reward dispenser 60 is a device that, when triggered by the main control module 55, a remote control, etc., is configured to perform one or more operations. In certain examples, the remote reward dispenser 60 may be configured to produce an audible marker/marking sound that "marks" for the canine that the canine has found a target odor. The remote reward dispenser 60 is also configured to, when triggered by the main control module 55, a remote control, etc., to dispense a reward (e.g., food) to the canine. To this end, the remote reward dispenser 60 includes a wireless receiver 63 that is configured to communicate with the main control module 55, a remote control, etc. In certain examples, the wireless receiver 63 may also be configured to communicate with a hand held remote control 64 and the wireless receiver 63 may be a multi-mode receiver (i.e., a receiver tuned/tuneable to the frequency of main control module 55 as well as to the frequency of a hand held remote control 64). The remote reward dispenser 60 also comprises a sound emitting element 66, at least one processor 61 (e.g., microprocessor or microcontroller), and a memory 62 which, in the example of FIG. 5, are implemented as part of one or more PCBs 65. In addition, the remote reward dispenser 60 comprises a storage compartment 67 for storing rewards, such as edible food items and other treats (e.g., reward toys), and a dispenser module 68 for dispensing a reward into an attached feed tray 69.

Further details of the automated scent training system 101 will now be described with reference to an example training session in which a handler/trainer works a canine around the training automated scent training wheel 100. Initially, the automated scent training system 101 is deployed in a training area (e.g., outdoor field, room, etc.) and a new "training session" is configured at the main control module 55 using an external control device, such as a computer (e.g., laptop, tablet, etc.), a mobile phone, remote control, etc. More specifically, the external control device includes user inputs (e.g., keyboard, touchscreen, etc.) and a display screen that is configured to expose a user interface, which is part of a control application accessed via the external control device, to the trainer or other user. The control application, and thus the user interface, may be a local or remote (e.g., web-based) application. The user interface may include a number of different screens, tabs, etc. that enable the trainer to set various attributes, parameters, settings, for the upcoming training session, as well as to enter other information associated with the training session.

The user interface may enable the handler to enter the animal name, the trainer name, a session identifier (ID), the number of scent receptacles 33 in use, the content of each of the scent receptacles 33 (or the content of a subset of the scent receptacles), identify which scent receptacle(s) 33 have a target scent source material, the target scent on which the canine is being trained, etc. During a typical training session, only one receptacle 33 would hold a target scent source material and target material and the other receptacles would be empty, or they would hold distractors or control/concomitant odor material.

The user interface may also enable the trainer to set various timing parameters associated with operation of the sensing system 70. For example, the trainer may set the time period duration for which a sensing beam 72 of a receptacle 33 that includes the target scent source material must be physically interfered with (i.e., broken) by the canine to trigger a marking sound and reward, the time period duration for which a sensing beam 72 of a receptacle 33 that does not include the target scent source material must be broken to trigger a false alert (i.e., too long of an investigation of a non-target odor), etc. That is, wheel 100 is user programmable to allow selection of, or adjustments to, the length of time the canine must have its nose in a receptacle 33 to initiate the reward and or no reward events.

The user interface may also enable the trainer to set other operational parameters of the automated training wheel 100 and/or the remote reward dispenser 60. For example, the trainer can set limits on the random or pseudo-random rotation of the wheel 100 after a reward (e.g., predetermine minimum and maximum rotation), timing of when to start/end the rotation, timing of when the remote reward dispenser 60 outputs the marking sound, duration of the marking sound, the type of marking sound, the quantity of reward to be dispensed, etc.

It is to be appreciated that the above described settings and information associated with the training session that may be entered at a user interface is illustrative and that other settings, information, etc. may be entered in accordance with embodiments herein. In general, the user interface may enable a trainer to adjust any of a number of different operational settings of the training wheel 100 and/or the remote reward dispenser 60, as well as to enter a wide variety of information associated with the training session.

The different operational settings for the automated training wheel 100 and/or the remote reward dispenser 60 selected by the trainer can be uploaded to the main control module 55. As noted, the main control module 55 includes a memory 58 in which the operational settings for the automated training wheel 100 and/or the remote reward dispenser 60 may be stored. The operational settings may be provided to the sensor module 45 and/or the remote reward dispenser 60, as needed. The operational settings, as well as the other information entered by the trainer, can be logged as part of the control application accessed via the external control device.

As noted, a training "session" is configured for a given animal (i.e., canine/dog) and is intended to capture all relevant search data over the course of one training session. A training session consists of a series of "trials" in which the dog searches for the active scent receptacle (i.e., the scent receptacle that includes the target scent source material). In general, each "trial" ends when the animal breaks a sensing beam 72 located across the opening of the target scent receptacle 33 for a period that exceeds a predetermined duration.

Prior to a first trial within a new training session, the main control module 55 may automatically initiate rotation of the carousel 30 so that the active scent receptacle 33 is located at a position that is unknown to the trainer. Since the position of the active scent receptacle 33 is unknown to the trainer, the first trial of the new training session may be run "blind" (i.e., a blind training trial).

summarized into a single 12-bit integer value to be sent by the sensor module 45 to main control module 55 for evaluation. Table 1, below, shows several example 12-bit integer values representative of possible beam sensor readings, as well as the value and meaning of the integer value.

TABLE 1

| Bit 12 | Bit 11 | Bit 10 | Bit 9 | Bit 8 | Bit 7 | Bit 6 | Bit 5 | Bit 4 | Bit 3 | Bit 2 | Bit 1 | Value | Remarks |
|---|---|---|---|---|---|---|---|---|---|---|---|---|---|
| 0 | 0 | 0 | 0 | 0 | 0 | 0 | 0 | 0 | 0 | 0 | 0 | 0 | No sensors active (all properly aligned, no obstruction) |
| 0 | 0 | 0 | 0 | 0 | 0 | 0 | 0 | 0 | 0 | 1 | 1 | 3 | Sensors 1 and 2 are active. This is an error condition. May indicate physical misalignment of one or more sensors or reflectors. |
| 0 | 0 | 0 | 0 | 0 | 0 | 0 | 0 | 1 | 0 | 0 | 0 | 16 | Sensor 4 is active. |
| 0 | 0 | 0 | 0 | 0 | 0 | 0 | 0 | 0 | 1 | 0 | 0 | 8 | Sensor 3 is active. |

Once the automated training wheel 100 and the remote reward dispenser 60 are deployed, the new training session is configured (e.g., the settings of the automated training wheel 100 and the remote reward dispenser 60 are selected by the trainer), and the active scent receptacle 33 is located at a position that is unknown to the trainer, the trainer can begin the first trial by walking the canine around the outer circumference of the automated training wheel 100 (i.e., near the scent receptacles 33). As noted, the sensing systems 70 located at the scent receptacles 33 enable the training system 101 to automatically detect when a canine investigates the associated scent receptacle 33 and, accordingly, to determine whether the canine has investigated a target scent or a non-target scent. More specifically, when a canine's nose enters a scent receptacle 33 the sensing beam 72 located across the opening of the scent receptacle 33 is broken, which triggers the associated reflective beam sensor 43 to send a signal to the sensor module 45 indicating the investigation of that receptacle by the canine. In addition, the triggering event (i.e., the time that the sensing beam 72 is broken) is also recorded by the sensor module 45.

In one example, each reflective beam sensor 43 sends data to sensor module 45 indicating the present state of operation of the sensor, where the state indicates whether the sensor is "active" (i.e., the associated sensing beam 72 is broken) or "inactive" (i.e., the associated sensing beam 72 is unbroken). When the state of any beam sensor changes, or when no activity has been detected for a period of time (e.g., at least one second), sensor module 45 sends a message (input) to main control module 55 via the wireless transceivers 47 and 57 to indicate the present state of beam sensors 43. While any beam sensor is active, messages are sent to the main control module 55 at increased periodic intervals (e.g., at least once every 200 milliseconds) to ensure that the main control module 55 receives reasonably current state information. All inputs from the sensing systems 70 are rapidly scanned by the sensor module 45. In other words, when a canine's nose enters a scent receptacle 33 and breaks the sensing beam 72, the sensor module 45 connected to the sensing system 70 sends a signal wirelessly to the main control module 55 and the event is timed and recorded.

As noted, each sensing system 70 can be active or inactive. In one example, an inactive system (i.e., an unbroken beam) is represented by a binary value of zero (0) and an active system (i.e., a broken beam) is represented by a binary value of one (1). As such, for an illustrative arrangement that includes twelve (12) scent receptacles 33 (and thus twelve sensing systems 70), the beam readings can be In one example, messages transmitted from sensor module 43 to main control module 55 are formatted to include: (1) a 32-bit millisecond-resolution timestamp of this event, (2) a 16-bit integer containing 12-bit sensor states word, (3) a 16-bit integer containing 12-bit sensor states from previous pass, (4) a 32-bit duration of current state in milliseconds, and (5) 16-bit battery-level reading, with a total message size of 14 bytes. It is to be appreciated that this message format and content is illustrative.

Returning to the training session example, for purposes of illustration it is assumed that the canine investigates an active scent receptacle 33 (i.e., a scent receptacle 33 that includes the target scent source material). That is, the canine puts its nose into the active scent receptacle 33, thereby breaking the sensing beam 72 located across the opening of the active scent receptacle 33. As noted, the breaking of the sensing beam 72 is detected and recorded by the sensor module 45. As a result, the next message(s) sent from the sensor module 45 to the main control module 55 indicate the investigation of the receptacle 33 and the details of the investigation (e.g., the timing).

As noted above, the main control module 55 is aware of which receptacle(s) include the target scent source material via the initial configuration/programming steps preceding the training session. As such, in response to receipt of the message(s), the main control module 55 determines that the canine has investigated a scent receptacle 33 that includes the target scent source material and, as such, that the canine's investigation should be marked and rewarded. Therefore, in certain examples, the main control module 55 instructs the remote reward dispenser 60 via transceiver 57 and receiver 63 (i.e., by sending a wireless message) to emit an audible marker sound (e.g., tone) and to dispense a reward. In other words, if the data received from the sensor module 45 establishes that the canine's nose enters an active scent receptacle 33 (i.e., having the target scent material disposed therein), main control module 55 sends a command signal to remote reward dispenser 60 to produce an audible marker sound (tone) and dispense a reward (i.e., edible food item or other treat). In one example, the sound emitter 66 emits 0.5 second audible sound. The marker sound provides a conditioned secondary reinforcing signal to indicate to the canine that the target scent material has been found and "marks" the start of the reward dispenser operation.

In certain examples, the receiver 63 of the remote reward dispenser 60 operates on an ISM radio band to receive commands from the main control module 55 to activate the audible marker sound and to engage dispenser module 68 to dispense a reward (e.g., food, chewable toy, ball, etc.). To avoid the potential for lost commands (e.g., caused by collision with asynchronous radio transmissions by the sensor module 45), the main control module 55 may send multiple copies of a command to the reward dispenser at period time intervals (e.g., 25 ms intervals). The commands sent to the remote reward dispenser 60 may be eight-byte messages and may include a sequence number which is incremented exactly once for each completed trial. The reward dispenser module 62 will ignore any redundant commands having the same sequence number since the food (or other reward) is already dispensed upon receipt of the first message with a new sequence number. This eliminates the need to transmit acknowledgement messages from reward dispenser module 62 back to main control module 55, yet ensures that the dog is rewarded for locating the active receptacle 33.

In addition to instructing the remote reward dispenser 60 to emit an audible marker sound and to dispense a reward, the main control module 55 is configured to automatically rotate the carousel 30. As such, the training session can continue blind, where the trainer remains unaware of the new location of the active scent receptacle(s) (i.e., the receptacles that include the target scent source material). The main control module 55 may apply any of a number of different processes to initiate at least one of random or pseudo-random rotation of the carousel 30. In the example of FIG. 5, the master control module 55 is connected to the motor controller 54, which is wired to the stepper motor 50. The motor controller 54, the stepper motor 50, and the pulleys 52 and 26, and drive belt 53 are sometimes collectively referred to herein as a drive motor assembly which operates to rotate the shaft 12, which in turn rotates the carousel 30.

As noted, in certain embodiments, the remote reward dispenser 60 may be configured to automatically emit a marking sound and dispense a reward in response to signals received from the main control module 55. However, it is to be appreciated that the remote reward dispenser 60 may also or alternatively operate based on signals received from, for example, a remote control 64. It is also to be appreciated that the remote reward dispenser 60 may emit a reward without emitting a marking sound. For example, in certain embodiments, the trainer may provide the marking sound (e.g., voice, whistle, clicker, etc.) and use the remote control 64 to cause the remote reward dispenser 60 to dispense a reward.

In general, the remote reward dispenser 60 is positioned some distance away from the automated training wheel 100 so that the canine must leave the wheel and go to the reward dispenser to receive the reward. While the canine is at the remote reward dispenser 60, the main control module 55 rotates the carousel so that the active scent receptacle 33 rotates a random (or pseudo-random) number of positions, thereby enabling a new trial in which the locations of the target and distractors/controls are unknown to the trainer (and canine).

The main control module 55 may initiate the random or pseudo-random rotation of the carousel 30 a predetermined period of time after the sensing system 70 has returned to an inactive/idle state. For example, once main control module 55 detects that sensing system 70 has been inactive for a predetermined time period (e.g., 500 milliseconds) that is sufficiently long to indicate that the canine has left the wheel, the main control module 55 will calculate a random rotation/repositioning duration and direction of rotation. The main control module 55 then sends signals to the motor controller 54 to activate the stepper motor 50 to rotate carousel 30 via shaft 12. That is, once the canine leaves the scent training wheel 100 and goes to remote reward dispenser 60 to retrieve the reward, main control module 55 sends a signal to motor controller 54 to activate stepper motor 50 such that rotatable carousel 30 is rotated a random number of positions to change the location of the target and distractor/control scent material. However, if the recorded data indicates that the dog's nose breaks the reflective beam of an inactive scent receptacle 33 (i.e., a scent receptacle holding distractor/control scent material) for a preset length of time, the event is recorded as a "false alert" and no command signal is sent to the remote reward dispenser 60.

Once the carousel is rotated, the current trial is concluded and a new trial within the same training session is automatically opened. For each trial, the start and end time, duration of trial, "visits" to any receptacles 33 on the carousel (e.g., where the sensor beam is broken for 200 milliseconds or longer), and any false-positive conditions (i.e., where the dog visits an inactive cup and remains until the full detection threshold is reached) are recorded in a session log file and in a training database of main control module 55. In other words, the main control module 55 can record and report/export to the external control device a variety of different types of information associated with the training session, such as (1) how long the canine pauses in each scent receptacle; (2) how many times the canine is rewarded in each training session; (3) how long each training session lasts, etc. As noted above, the main control module 55 is user programmable (e.g., via the external control device) to allow for adjustments to the length of time the canine must have its nose in a cup before a reward or no reward event is to be initiated.

The trainer may work the canine through multiple trials within a single training session. However, once the training session is ended, the main control module 55 is configured to send/export all of the data recorded during the training session (i.e., the data logged for each of the trials) to the external control device. This "session record data" is stored with the information about the session entered by the trainer at the time the session was initiated, as a "session log" for subsequent use by the trainer or other user.

In general, the training of scent detection canines (dogs) can be segregated into a multi-stage process. The first stage, often called "imprinting," conditions the canine to connect the target scent with a desired rewards (i.e., edible food item or reward toy). During this stage, it is desirable for the reward "marker" (audible marker sound from sound emitter 66) to occur as soon as the dog's nose enters the correct cup. The second stage is an operant stage where the "marker" and rewards are gradually delayed to reinforce a desired response from the dog such as "sit" or "freeze" to indicate that the dog has found the target scent/odor.

During operant training, the remote reward dispenser 60 can be run in a full automatic mode or in a mode where the handler/trainer initiates the reward "marker" and dispensing operation with the hand held remote control 64. During the operant training step, the delay between the dog's nose entering a scent receptacle 33 and the remote reward dispenser 60 marking this as the correct cup is increased at a variable rate to increase the duration of the dog's indication behavior. The parameters of the delay are trainer programmable. During this training phase, if the only desired response from the dog is to "freeze" with its nose in scent receptacle 33 the carousel 30 can be run in a full automatic mode as well. However, if there is a specific indication behavior desired of the dog (for instance—"sit"), the trainer can operate the remote reward dispenser 60 with hand held remote 64. In this operating mode, instead of automatically sending commands to the reward dispenser 60, the main control module 55 instead sends/provides the trainer with a first signal (e.g., causing the remote control 64 to issue a first visual signal) that indicates the canine's nose is in the correct scent receptacle 33 and then a second signal (e.g., causing the remote control 64 to issue a second visual signal) that indicates the desired delay has ended so the trainer can initiate the operation of the remote reward dispenser 60 when he/she is satisfied that the canine has performed the necessary behavior before being rewarded.

Figure 6:
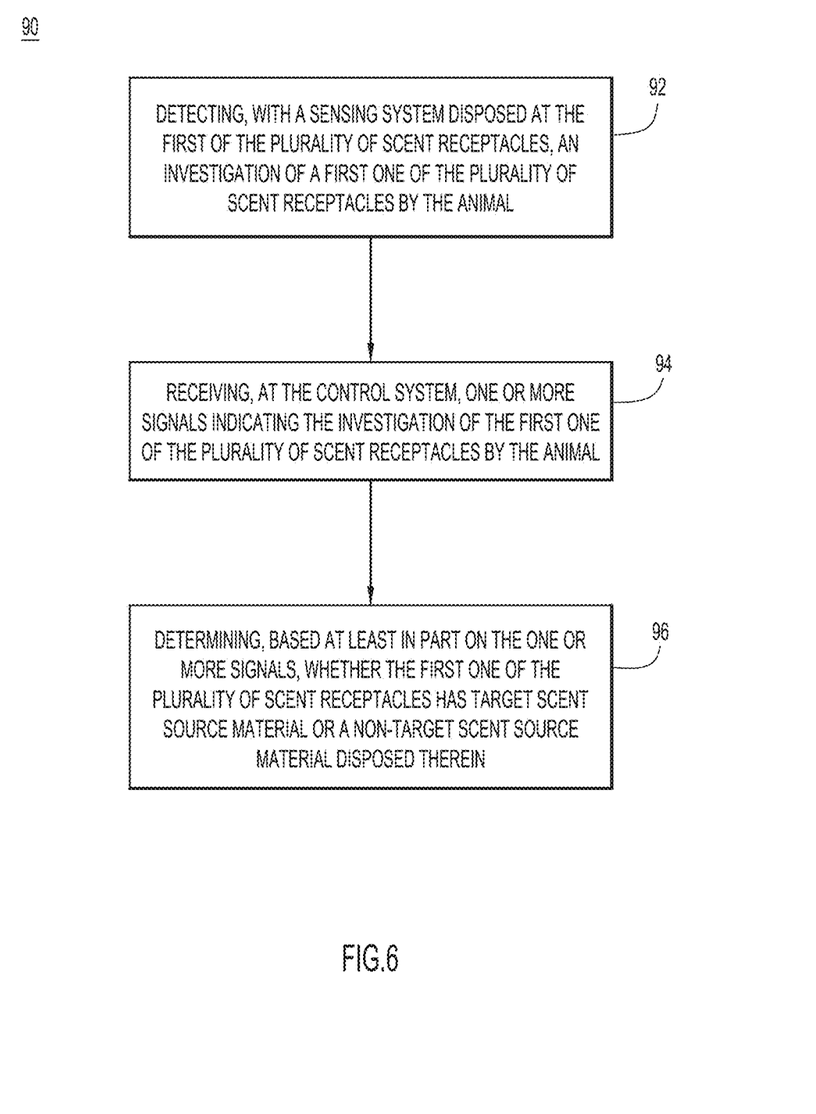
FIG. 6 is a flowchart of a method, in accordance with certain embodiments presented herein.

FIG. 6 is a flowchart of a method 90 for scent training an animal in accordance with certain embodiments presented herein. The method 90 is performed by an automated scent training wheel that includes a rotatable carousel, a plurality of scent receptacles coupled to the rotatable carousel, a plurality of sensing systems each disposed at one of the scent receptacles, and a control system. Method 90 begins at 92 where a sensing system disposed at the first of the plurality of scent receptacles detects an investigation of the first one of the plurality of scent receptacles by the animal. At 94, the control system receives one or more signals indicating the investigation of the first one of the plurality of scent receptacles by the animal. At 96, the control system determines, based at least in part on the one or more signals, whether the first one of the plurality of scent receptacles has target scent source material or a non-target scent source material disposed therein. In accordance with embodiments presented herein, the control system can initiate one or more operations depending on whether it is determined that the first one of the plurality of scent receptacles (i.e., the one investigated by the animal) has target scent source material disposed therein.

As noted above, for ease of illustration embodiments of the present invention have primarily described with reference to sensing systems 70 that comprise a reflective beam sensor 43 and a corresponding reflector 44. However, also as noted above, sensing systems 70 in accordance with embodiments presented herein may have other arrangements. For example, a sensing system in accordance with embodiments presented herein may comprise a diffuse reflective sensor instead of a reflective beam sensor 43 and a corresponding reflector 44. Additionally or alternatively, a sensing system in accordance with embodiments presented herein may comprise a retro-reflective sensor instead of a reflective beam sensor 43 and a corresponding reflector 44.

Figure 7:
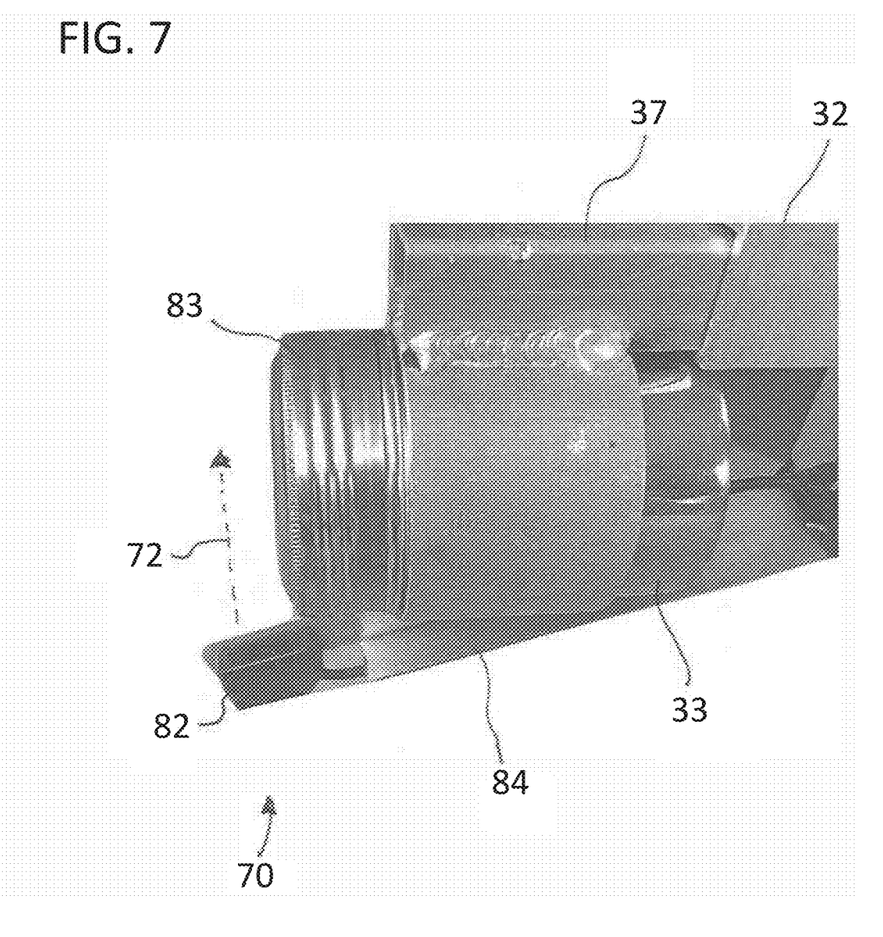
FIG. 7 is a schematic side view illustrating a sensing system that comprises a diffuse reflective sensor, in accordance with certain embodiments presented herein.

FIG. 7 is schematic view of an embodiment of the present invention in which the sensing system 70 comprises a diffuse reflective sensor 82 positioned outside of a scent receptacle 33. For example, as shown in FIG. 7, the diffuse reflective sensor 82 may be positioned below and slightly forward of (slightly in front of) the scent receptacle 33. Also as shown in FIG. 7, the diffuse reflective sensor 82 may be oriented at an angle. In this arrangement, the diffuse reflective sensor 82 emits at least one sensing beam 72 (e.g., a beam of light) across the front of the scent receptacle 33. FIG. 7 illustrates that the scent receptacle 33 also includes a cover/lid 83 and that the at least one sensing beam 72 extends across this cover 83. In the example of FIG. 7, the diffuse reflective sensor 82 is attached to, and held in place by, an arm 84. However, it is to be appreciated that the diffuse reflective sensor 82 may alternatively be held in position via other mechanisms (e.g., attachment to the scent receptacle 33 or another component). It is also to be appreciated that the specific positioning of the diffuse reflective sensor 82 shown in FIG. 7 is merely illustrative.

As noted, the sensing systems 70 located at the scent receptacles 33 enable the training system 101 to automatically detect when a canine investigates the associated scent receptacle 33 and, accordingly, to determine whether the canine has investigated a target scent or a non-target scent. More specifically, with reference to the embodiment of FIG. 7, when a canine's nose is placed in front of the scent receptacle 33 (e.g., in front of the scent receptacle cover 83), the at least one sensing beam 72 emitted by an emitter in the diffuse reflective sensor 82 bounces off the canine when the canine breaks the at least one sensing beam 72. A receiver in the diffuse reflective sensor 82 (i.e., within the same housing as the emitter) captures the presence of the canine (i.e., a reflection of the at least one sensing beam 72 from the canine), which triggers diffuse reflective sensor 82 to send a signal to the sensor module 45 indicating the investigation of that receptacle by the canine. In addition, the triggering event (i.e., the time that the at least one sensing beam 72 is broken) is also recorded by the sensor module 45. This, coupled with the placement of the diffuse reflective sensor 82 outside of the scent receptacle 33, captures information when the canine investigates or sniffs near the scent receptacle 33 and does not rely on the canine to actually place his/her nose inside the scent receptacle 33 to trigger the sensor.

In one example, each diffuse reflective sensor 82 sends data to sensor module 45 indicating the present state of operation of the sensor, where the state indicates whether the sensor is "active" (i.e., the associated at least one sensing beam 72 is being reflected) or "inactive" (i.e., the associated at least one sensing beam 72 is not being reflected). When the state of any beam sensor changes, or when no activity has been detected for a period of time (e.g., at least one second), sensor module 45 sends a message (input) to main control module 55 via the wireless transceivers 47 and 57 to indicate the present state of beam sensors 43. While any beam sensor is active, messages are sent to the main control module 55 at increased periodic intervals (e.g., at least once every 200 milliseconds) to ensure that the main control module 55 receives reasonably current state information. All inputs from the sensing systems 70 are rapidly scanned by the sensor module 45. In other words, when a canine investigates a scent receptacle 33 and causes the at least one sensing beam 72 to be reflected, the sensor module 45 connected to the sensing system 70 sends a signal wirelessly to the main control module 55 and the event is timed and recorded.

As noted, each sensing system 70 can be active or inactive. In one example, an inactive system (i.e., a non-reflected beam) is represented by a binary value of zero (0) and an active system (i.e., a reflected beam) is represented by a binary value of one (1). As such, for an illustrative arrangement that includes twelve (12) scent receptacles 33 (and thus twelve sensing systems 70 each comprising a diffuse reflective sensor 82), the beam readings can be summarized into a single 12-bit integer value to be sent by the sensor module 45 to main control module 55 for evaluation. Table 2, below, shows several example 12-bit integer values representative of possible beam sensor readings, as well as the value and meaning of the integer value.

TABLE 2

| Bit 12 | Bit 11 | Bit 10 | Bit 9 | Bit 8 | Bit 7 | Bit 6 | Bit 5 | Bit 4 | Bit 3 | Bit 2 | Bit 1 | Value | Remarks |
|---|---|---|---|---|---|---|---|---|---|---|---|---|---|
| 0 | 0 | 0 | 0 | 0 | 0 | 0 | 0 | 0 | 0 | 0 | 0 | 0 | No sensors active (all properly aligned, no obstruction) |
| 0 | 0 | 0 | 0 | 0 | 0 | 0 | 0 | 0 | 0 | 1 | 1 | 3 | Sensors 1 and 2 are active. This is an error condition. May indicate physical misalignment of one or more sensors or reflectors. |
| 0 | 0 | 0 | 0 | 0 | 0 | 0 | 0 | 1 | 0 | 0 | 0 | 16 | Sensor 4 is active. |
| 0 | 0 | 0 | 0 | 0 | 0 | 0 | 0 | 0 | 1 | 0 | 0 | 8 | Sensor 3 is active. |

In one example, messages transmitted from sensor module 43 to main control module 55 are formatted to include: (1) a 32-bit millisecond-resolution timestamp of this event, (2) a 16-bit integer containing 12-bit sensor states word, (3) a 16-bit integer containing 12-bit sensor states from previous pass, (4) a 32-bit duration of current state in milliseconds, and (5) 16-bit battery-level reading, with a total message size of 14 bytes. It is to be appreciated that this message format and content is illustrative.

Figure 8:
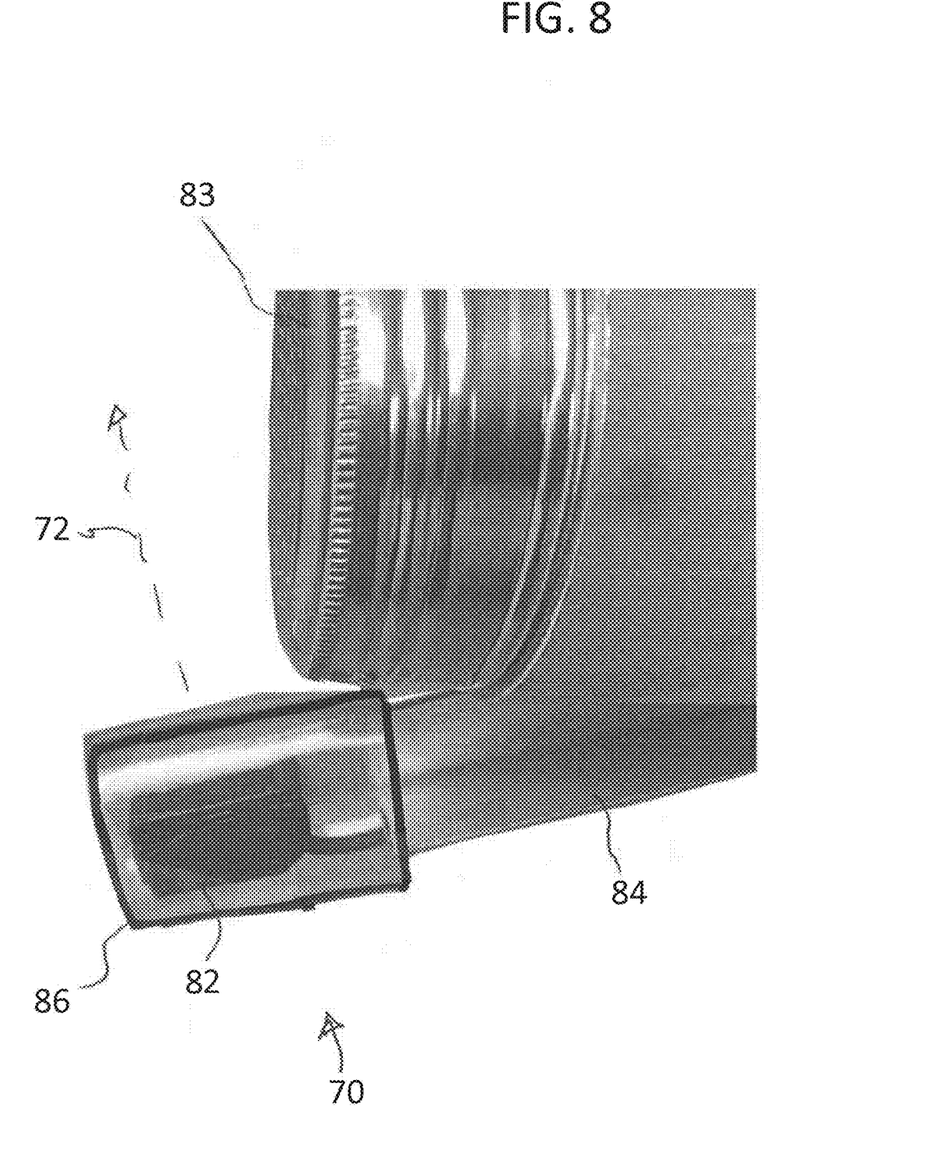
FIG. 8 is a schematic side view illustrating a cover for a diffuse reflective sensor, in accordance with certain embodiments presented herein.

As noted, the diffuse reflective sensors 82 in accordance with embodiments presented herein are positioned outside of the scent receptacles. As shown in FIG. 8, a diffuse reflective sensor 82 may be covered by a translucent or transparent cover 86 to prevent the sensor from being contaminated with target/non-target odors or by contact with the canine.

FIGS. 7 and 8 illustrate embodiments that include diffuse reflective sensors 82 to determine when a canine investigates or sniffs near the scent receptacle 33. Since the diffuse reflective sensors 82 are located outside of the scent receptacles 33, these embodiments do not rely on the canine to place his/her nose inside the scent receptacle 33 to trigger the sensor. It is to be appreciated that the diffuse reflective sensors 82 are illustrative and that other types of sensors may be placed located outside of the scent receptacles 33 and used in a similar manner. For example, other embodiments may alternatively make use of retro-reflective sensors.

In summary, the automated scent training wheel 100, automated scent training system 101, and associated methods, as described above, may be useful for training canines (dogs) and other animals to detect and respond to target scents based on unknown or "blind" locations rather than on "known hides" locations. Additionally, automated scent training system 101 may be particularly useful for performing target scent "imprinting" in animals (i.e., dogs) such that the dog will be able to identify target scent materials in quantities deemed significant, with a low percentage of misses, and a low percentage of false alerts. In the described exemplary embodiment, automated scent training system 101 may be useful for not only imprinting an animal (dog) on novel scents but may be useful for ongoing training of an animal to strengthen and maintain a target scent/reward association. The target scent source material may comprise any material that provides or replicates a scent that the user would like an animal to eventually learn to detect.

As noted, the specific training examples provided above are merely illustrative. As such, the invention described and claimed herein is not to be limited in scope by the specific embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. Also, it is understood that various omissions or substitutions of equivalents are contemplated as circumstances may suggest or render expedient, but is intended to cover the application or implementation without departing from the spirit or scope of the claims of the present invention. Although specific terms are employed herein, they are used in a generic and descriptive sense only and not for purposes of limitation.

What is claimed is:

1. An automated scent training wheel for training animals to detect and respond to target scents, comprising:
   a rotatable carousel;
   a plurality of elongated support arms attached to and radially projecting outward from the rotatable carousel;
   a plurality of ring-shaped sleeve members each attached to a distal end of one of the support arms, wherein the sleeve members each have a cylindrical wall defining an open ended cavity extending in a horizontal direction;
   a plurality of scent receptacles each detachably coupled to one of the plurality of ring-shaped sleeves, wherein the scent receptacles are each configured to hold scent source material therein; and
   a plurality of sensing systems each disposed at one of the plurality of scent receptacles, wherein each sensing system is configured to automatically detect investigation of the associated scent receptacle by an animal.

2. The automated scent training wheel of claim 1, further comprising:
   a control system configured to receive one or more signals from one or more of the sensing systems and, based on information in the one or more signals, to automatically initiate rotation of the rotatable carousel in response to a determination that the animal has investigated a selected scent receptacle.

3. The automated scent training wheel of claim 2, wherein the control system is configured to initiate at least one of random or pseudo-random rotation of the rotatable carousel.

4. The automated scent training wheel of claim 1, further comprising:
   a control system configured to receive one or more signals from one or more of the sensing systems and, based on information in the one or more signals, to automatically transmit one or more commands to a remote reward dispenser, wherein the one or more commands are configured to cause the remote reward dispenser to dispense a reward to the animal.

5. The automated scent training wheel of claim 1, wherein each of the plurality of sensing systems comprise a reflective beam sensor and a reflector configured to create a sensing beam across an associated scent receptacle.

6. The automated scent training wheel of claim 1, wherein each of the plurality of sensing systems comprises a diffuse reflective sensor configured to create at least one sensing beam across an associated scent receptacle.

7. The automated scent training wheel of claim 1, further comprising:
a control system configured to receive one or more signals from one or more of the sensing systems and, based on information in the one or more signals, record sensor data for subsequent export to a computing device.

8. A scent training system comprising the automated scent training wheel of claim 1, and further comprising:
a control system comprising at least one wireless transceiver; and
a remote reward dispenser comprising at least one wireless receiver configured to receive commands from the at least one wireless transceiver of the control system.

9. The scent training system of claim 8, wherein the control system is configured to receive signals from the plurality of sensing systems and, based at least in part on the signals received from the plurality of sensing systems, determine when an animal investigates a selected one of the plurality of scent receptacles.

10. The scent training system of claim 9, wherein the control system is configured to, based at least in part on the signals received from the plurality of sensing systems, record sensor data for subsequent export to a computing device.

11. The scent training system of claim 8, wherein in response to determining that an animal investigates a selected one of the plurality of scent receptacles, the control system is configured to wirelessly transmit one or more commands to the remote reward dispenser, wherein, in response to the one or more commands, the remote reward dispenser is configured to dispense a reward to the animal.

12. The scent training system of claim 11, wherein, in response to the one or more commands, the remote reward dispenser is configured to emit an audible marking sound.

13. The scent training system of claim 8, wherein in response to determining that an animal investigates a selected one of the plurality of scent receptacles, the control system is configured to automatically initiate rotation of the rotatable carousel.

14. The automated scent training wheel of claim 1,
wherein each support arm is formed as an elongated hollow tube and includes an elongated extension support arm configured to be telescopically received within an interior of the hollow support arm, and
wherein one of the ring-shaped sleeve members is attached to a distal end of each extension support arm.

15. The automated scent training wheel of claim 1,
wherein the scent receptacles each have an elongated cylindrical body defining an interior cavity in which a removable glass container holding scent source material is placed, and
wherein each glass container is removably held within the interior cavity by a frictional fit.

16. The automated scent training wheel of claim 15,
wherein the cylindrical body of each cup has diametrically opposed openings extending therethrough,
wherein a reflective beam sensor is attached to one of the openings and a reflector is attached to another of the openings, and
wherein the glass container permits a light beam from the beam sensor to pass through the interior cavity, strike the reflector, and be reflected back to the beam sensor.

17. The automated scent training wheel of claim 16,
wherein at least one sensor module is disposed at an upper or lower surface of the rotatable carousel, and
wherein the reflective beam sensor of each scent receptacle is connected to and powered by the sensor module.

18. The automated scent training wheel of claim 17, wherein the reflective beam sensor is wired to or wirelessly connected to the at least one sensor module.

19. The automated scent training wheel of claim 1, further comprises: a drive motor assembly and a rotary drive shaft to rotate the carousel relative to the base,
wherein the drive motor assembly includes a pulley affixed to the drive shaft, a stepper motor including a rotary motor shaft, a rotational coupling system configured as a pulley secured to the rotary motor shaft, and a drive belt engaging the pulleys.

20. The automated scent training wheel of claim 19, wherein the coupling system transfers rotational motion of the motor shaft to the pulley secured to the rotary drive shaft to rotate the carousel relative to the base about a vertical rotational axis.

* * * * *